(12) United States Patent
Boyd

(10) Patent No.: US 10,285,396 B2
(45) Date of Patent: May 14, 2019

(54) GAME TRACKING DEVICE

(71) Applicant: William K. Boyd, North Muskegon, MI (US)

(72) Inventor: William K. Boyd, North Muskegon, MI (US)

( * ) Notice: Subject to any disclaimer, the term of this patent is extended or adjusted under 35 U.S.C. 154(b) by 280 days.

(21) Appl. No.: 14/744,383

(22) Filed: Jun. 19, 2015

(65) Prior Publication Data

US 2016/0000061 A1 Jan. 7, 2016

Related U.S. Application Data

(60) Provisional application No. 62/020,599, filed on Jul. 3, 2014.

(51) Int. Cl.
G08B 1/00 (2006.01)
A01M 31/00 (2006.01)
H04W 4/02 (2018.01)

(52) U.S. Cl.
CPC ............ *A01M 31/002* (2013.01); *H04W 4/02* (2013.01)

(58) Field of Classification Search
CPC ............................... A01M 31/002; H04W 4/02
USPC ...................................................... 340/539.32
See application file for complete search history.

(56) References Cited

U.S. PATENT DOCUMENTS

| | | | |
|---|---|---|---|
| 4,801,151 A | 1/1989 | Sturm et al. | |
| 4,885,800 A | 12/1989 | Ragle | |
| RE33,470 E | 12/1990 | Boy et al. | |
| 4,976,442 A * | 12/1990 | Treadway | F42B 12/385 473/570 |
| 5,024,447 A | 6/1991 | Jude | |
| 5,157,405 A * | 10/1992 | Wycoff | F42B 12/385 342/386 |
| 5,188,373 A * | 2/1993 | Ferguson | F42B 12/385 473/578 |
| 5,450,614 A * | 9/1995 | Rodriguez | F42B 12/385 455/128 |
| 6,373,469 B1 * | 4/2002 | Chen | G06F 3/03543 345/156 |
| 6,409,617 B1 * | 6/2002 | Armold | F42B 12/385 455/98 |
| 6,612,947 B2 * | 9/2003 | Porter | F42B 12/385 473/578 |
| 6,764,420 B2 | 7/2004 | Cyr et al. | |
| 6,814,678 B2 * | 11/2004 | Cyr | F42B 12/385 455/98 |
| 7,232,389 B2 * | 6/2007 | Monteleone | F42B 12/40 473/578 |
| 7,300,367 B1 * | 11/2007 | Andol | F42B 12/385 342/385 |

(Continued)

*Primary Examiner* — Tanmay K Shah
(74) *Attorney, Agent, or Firm* — Gardner, Linn, Burkhart & Ondersma LLP

(57) ABSTRACT

A game tracking device for tracking a target that has been hit by a projectile is configured to attach to a projectile and includes a transmitter and a power source disposed within a transmitter housing having one or more catching members. The transmitter is operable to emit a locating signal that is capable of detection by a remote receiving device. The catching members include hooking elements or barbs configured to attach the tracking device to the target. The catching members remain in a retracted position where the hooking elements are generally concealed within the transmitter housing until deployed.

11 Claims, 8 Drawing Sheets

(56) References Cited

U.S. PATENT DOCUMENTS

| | | | |
|---|---|---|---|
| 7,331,887 B1* | 2/2008 | Dunn | F42B 12/385 455/98 |
| 7,837,580 B2 | 11/2010 | Huang et al. | |
| 7,862,457 B1* | 1/2011 | Urcheck | F42B 6/06 473/570 |
| 8,128,520 B2* | 3/2012 | Miner | F42B 12/387 473/578 |
| 8,192,309 B1* | 6/2012 | Roberts | F42B 12/385 473/578 |
| 8,251,845 B2* | 8/2012 | Bay | F41G 1/35 473/570 |
| 8,323,132 B2* | 12/2012 | Kirsch | F42B 12/385 473/578 |
| 8,393,982 B2* | 3/2013 | Ferguson | F42B 12/385 473/578 |
| 8,399,817 B1 | 3/2013 | Rayms-Keller et al. | |
| 8,425,354 B2* | 4/2013 | Ferguson | F42B 6/04 473/578 |
| 8,446,282 B1 | 5/2013 | Warner et al. | |
| 8,795,109 B2* | 8/2014 | Roman | F42B 6/04 473/570 |
| 8,952,808 B2* | 2/2015 | Steinman | G08C 19/00 340/539.13 |
| 9,062,947 B1* | 6/2015 | Patel | F42B 12/385 |
| 9,151,580 B2* | 10/2015 | Pedersen | F42B 6/06 |
| 9,307,300 B2* | 4/2016 | DiSanto | G08C 19/16 |
| 2003/0132846 A1* | 7/2003 | Hilliard | G01S 13/758 340/573.2 |
| 2005/0231362 A1 | 10/2005 | Pridmore, Jr. et al. | |
| 2007/0105668 A1* | 5/2007 | Kikos | F42B 12/385 473/578 |
| 2007/0109656 A1* | 5/2007 | Aubin | G02B 26/0858 359/623 |
| 2008/0287229 A1* | 11/2008 | Donahoe | F41B 5/14 473/570 |
| 2009/0044758 A1* | 2/2009 | Adams | A01K 15/021 119/496 |
| 2009/0098960 A1* | 4/2009 | Brywig | F42B 6/06 473/578 |
| 2010/0035709 A1* | 2/2010 | Russell | F42B 12/385 473/570 |
| 2011/0226038 A1* | 9/2011 | Donahoe | F42B 6/04 73/12.05 |
| 2011/0250996 A1* | 10/2011 | Jones | F42B 12/385 473/570 |
| 2012/0146770 A1 | 6/2012 | Brannen et al. | |
| 2012/0322587 A1* | 12/2012 | Duke | A63B 69/0071 473/450 |
| 2013/0036654 A1* | 2/2013 | Goosey | A01K 85/01 43/42.31 |
| 2013/0176175 A1* | 7/2013 | Zusman | G01S 5/0226 342/458 |

* cited by examiner

GAME TRACKING DEVICE

CROSS REFERENCE TO RELATED APPLICATION

This application claims priority from U.S. provisional patent application Ser. No. 62/020,599 filed Jul. 3, 2014, the disclosure of which is hereby incorporated herein by reference in its entirety.

FIELD OF THE INVENTION

The present invention relates generally to remote tracking systems and, more specifically, to detachable electronic transmitters for tracking a target that has been shot.

BACKGROUND OF THE INVENTION

Hunters have a respect for nature and the game they hunt. They make every effort to make a clean shot that ends the life of the game quickly. However, often times, even with a well-placed shot, the target animal is not immediately killed and may run off into the woods after being wounded before dying. In this case, the animal needs to be tracked, sometimes over great distances. One method of tracking the wounded animal is to follow the blood trail, but this may be difficult if there is rain or fresh snowfall that affects the visibility of the blood trail, or if there is little blood that escapes from the wound. Another method is to provide a radio transmitting device that attaches to the animal and emits a signal that may be detected by a remote receiver.

SUMMARY OF THE INVENTION

The present invention provides a game tracking device for tracking a target that has been hit by a projectile. The tracking device is configured to attach to a projectile and includes a transmitter and a power source disposed within a transmitter housing having one or more catching members. The transmitter is operable to emit a locating signal that is capable of detection by a remote receiving device. The catching members include hooking elements or barbs configured to attach the tracking device to the target. The catching members remain in a retracted position where the hooking elements are generally concealed within the transmitter housing until deployed. This helps prevent the hooking elements from inadvertently catching on a user or other unwanted object. It also allows the projectile to be launched using the same equipment that would be used to launch the projectile without the tracking device attached. An inertial mass or an inertial sensing element within the tracking device may be used to deploy the catching members upon launch or upon impact with the target. When deployed, the hooking elements protrude external to the transmitter housing for attaching to the target. The tracking device may be fracturally attached to the projectile so the projectile may continue through the target while the tracking device remains with the target.

These and other objects, advantages, purposes and features of the present invention will become more apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like numbered elements in the figures.

Figure 1:
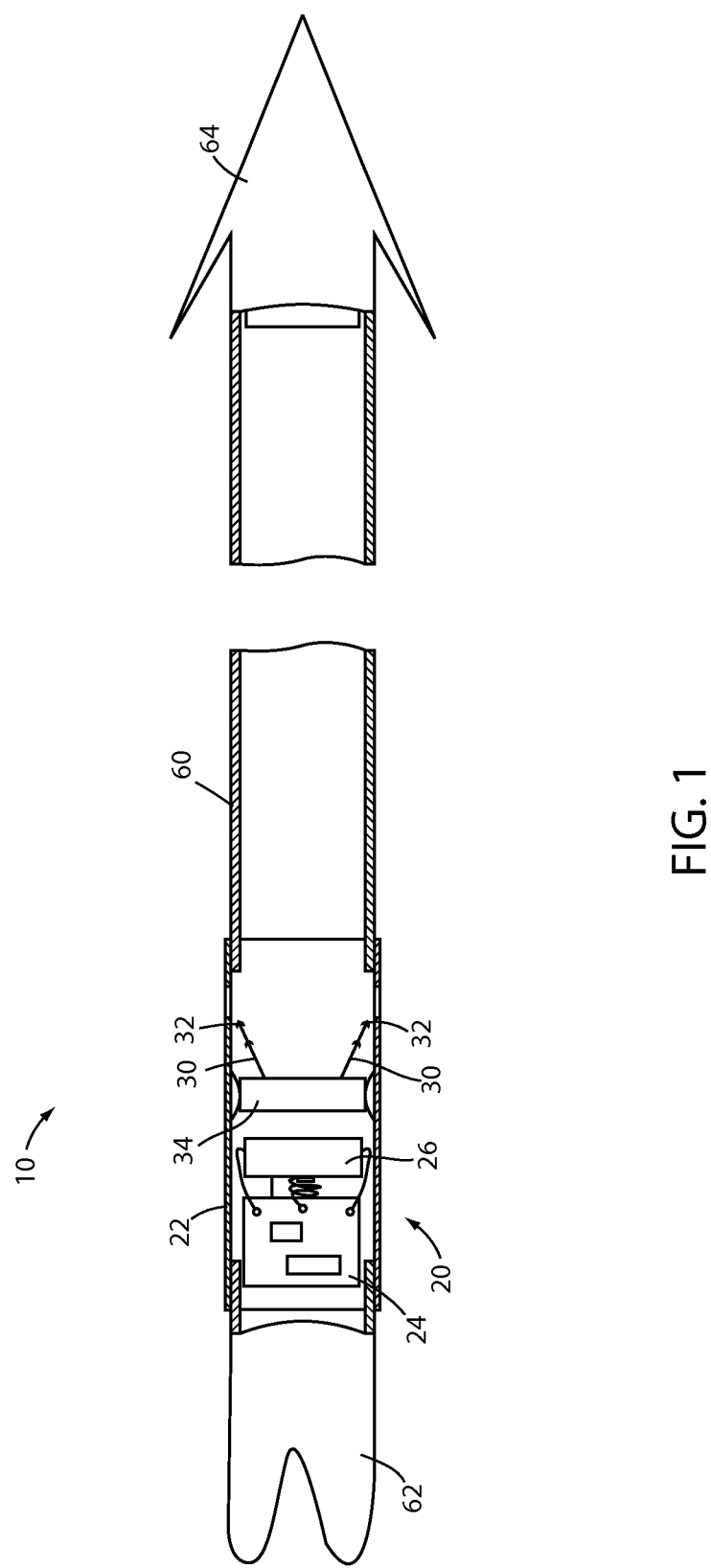
FIG. 1 is a partial sectional view of an arrow incorporating a tracking device in accordance with the present invention.
Figure 3:
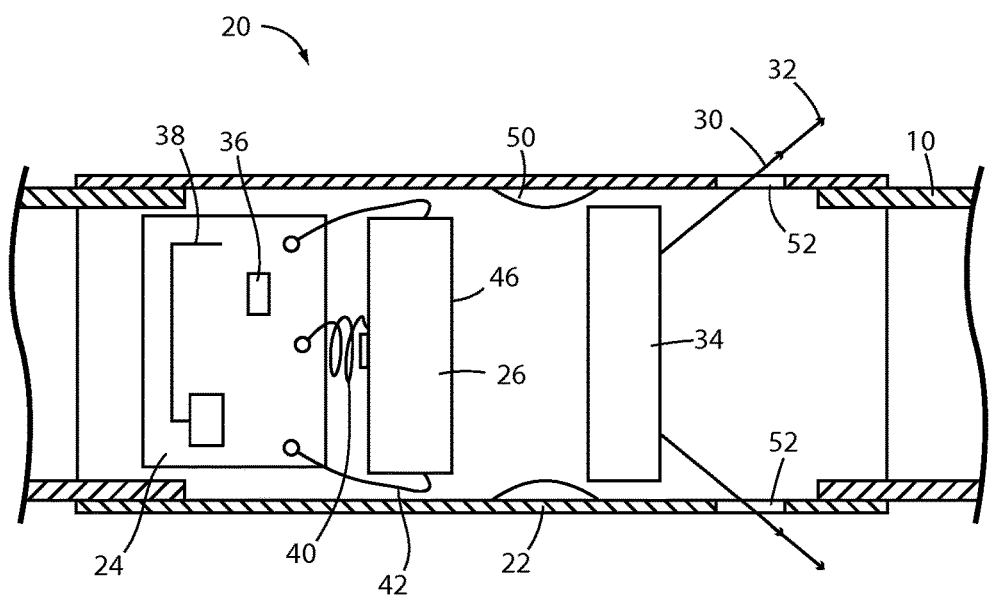
FIG. 3 is a sectional view of the tracking device of FIG. 1, shown with the catching members deployed.

In the illustrated embodiment of FIG. 1, a projectile 10, in this case an arrow, includes a tracking device 20 having a housing 22, a transmitter 24, a power source 26, and a pair of catching members 30. Catching members 30 include hooking elements or barbs 32 configured to attach to a target animal as projectile 10 passes through the target. Before projectile 10 is launched, catching members 30 are in a retracted position as shown in FIG. 1, where the barbs 32 of catching member 30 are generally concealed within housing 22. This helps to prevent the barbs 32 of catching member 30 from inadvertently hooking to a user or other unwanted object during launch. Also, having catching members 30 concealed in housing 22 minimizes the effect of catching members 30 on the aerodynamics of projectile 10. Upon impact with the target, projectile 10 decelerates while the inertia of a mass 34 movable within housing 22 moves catching members 30 to an extended or deployed position as shown in FIG. 3, where the barbs 32 of catching members 30 protrude external to housing 22 for securing tracking device 20 to the target. Tracking device 20 may be fracturally or frictionally attached to projectile 10, allowing projectile 10 to continue through the target while the tracking device 20 remains attached to or embedded in the target. Power source 26 provides electrical energy to transmitter 24, which emits a locating signal capable of detection by a remote receiving device.

Figure 2:
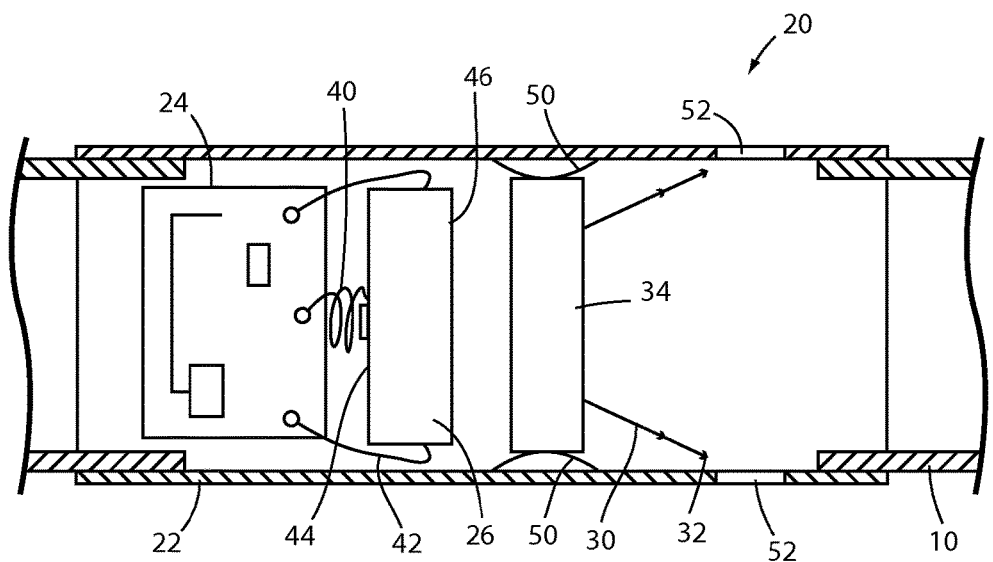
FIG. 2 is a sectional view of the tracking device of FIG. 1.

Referring now to FIGS. 2 and 3, transmitter 24 is a radio frequency (RF) transmitter having a clocking element 36 and an antenna 38. Clocking element 36 is used to establish the transmit frequency of transmitter 24 and is preferably a microelectromechanical system (MEMS) oscillator or a surface acoustic wave (SAW) oscillator to better withstand the high shock experienced during the rapid acceleration of launch and the rapid deceleration at impact.

Transmitter 24 receives electrical power from power source 26. Power source 26 may be allowed to move within housing 22 relative to transmitter 24 so that electrical power to transmitter 24 may be disconnected when not in use. Power source 26 establishes an electrical connection with transmitter 24 through a positive and a negative contact 40 and 42. In the illustrated embodiment, positive contact 40 is a collapsible conductive spring operable to make an electrical connection with a positive terminal 44 of power source 26. Negative contact 42 is a pair of spring steel tabs operable to make an electrical connection with a negative terminal 46 of power source 26. Optionally, positive contact 40 and negative contact 42 may be constructed from any type of conductive material and may be arranged in any configuration that allows an electrical connection between power source 26 and transmitter 24.

While not in use, the electrical connection between power source 26 and positive contact 40 and/or negative contact 42 is broken or otherwise interrupted as shown in FIG. 2, preventing the flow of electrical current to transmitter 24. In the illustrated embodiment, the frictional force between negative contact 42 and power supply 26 is used to restrict the movement of power source 26 within housing 22. When projectile 10 is launched, housing 22 and attached transmitter 24 experience a rapid acceleration relative to power source 26, causing power source 26 to move toward transmitter 24. As it does, power source 26 compresses positive contact 40 and negative contact 42 snaps in place over negative terminal 46 as shown in FIG. 3, completing the electrical circuit and activating transmitter 24 in tracking device 20. Optionally, power source 26 may be arranged within housing 22 so as to create an electrical connection with transmitter 24 at the time of impact rather than at launch. In this configuration, the sudden deceleration experienced at impact causes the movement of power source 26 relative to transmitter 24 necessary to make the electrical connection.

Upon impact, tracking device 20 is configured to detach from projectile 10 and remain with the target. Tracking device 20 includes a pair of retractable catching members 30 for attaching tracking device 20 to the target. Prior to impact, barbs 32 of catching members 30 remain in a retracted or concealed position within housing 22 (FIG. 2). Concealing catching members 30 within housing 22 prevents the barbs 32 from inadvertently catching or hooking onto a user or other unwanted object, such as the bow or bow attachments, which may interfere with the flight of the projectile.

Catching members 30 attach to mass 34. Mass 34 is configured to move within housing 22, allowing barbs 32 of catching members 30 to deploy external to housing 22. A damping or retention element 50, such as a leaf spring or the like, formed in housing 22 is used to restrain movement of mass 34 within housing 22 so barbs 32 remain generally concealed within housing 22 until impact. When projectile 10 impacts the target, housing 22 experiences a rapid deceleration. The inertia of mass 34 overcomes the resistive force of damping element 50, allowing mass 34 to continue to move forward following the trajectory of projectile 10. As mass 34 moves forward in housing 22, barbs 32 of catching members 30 protrude external to housing 22 as shown in FIG. 3 and attach to or embed in the target. The forward momentum of projectile 10 causes tracking device 20 to separate from projectile 10, allowing projectile 10 to continue travel through the target. Housing 22 may have slots or openings 52 or a pierceable material through which catching members 30 may extend when deployed. Optionally, housing 22 may be constructed of a pierceable material that catching members 30 penetrate when deployed.

Figure 4:
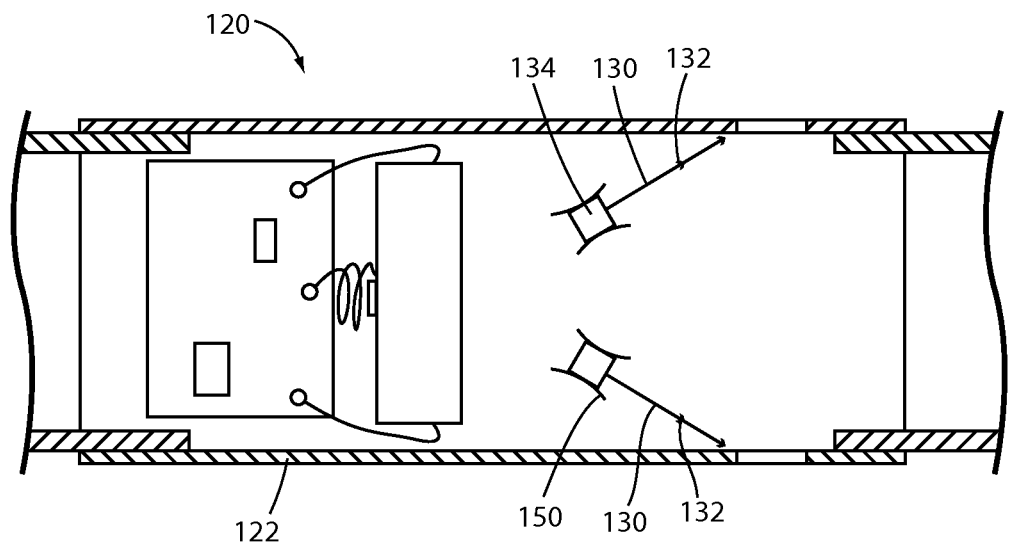
FIG. 4 is a sectional view of an alternative embodiment of a tracking device where the catching members include an inertial mass.
Figure 5:
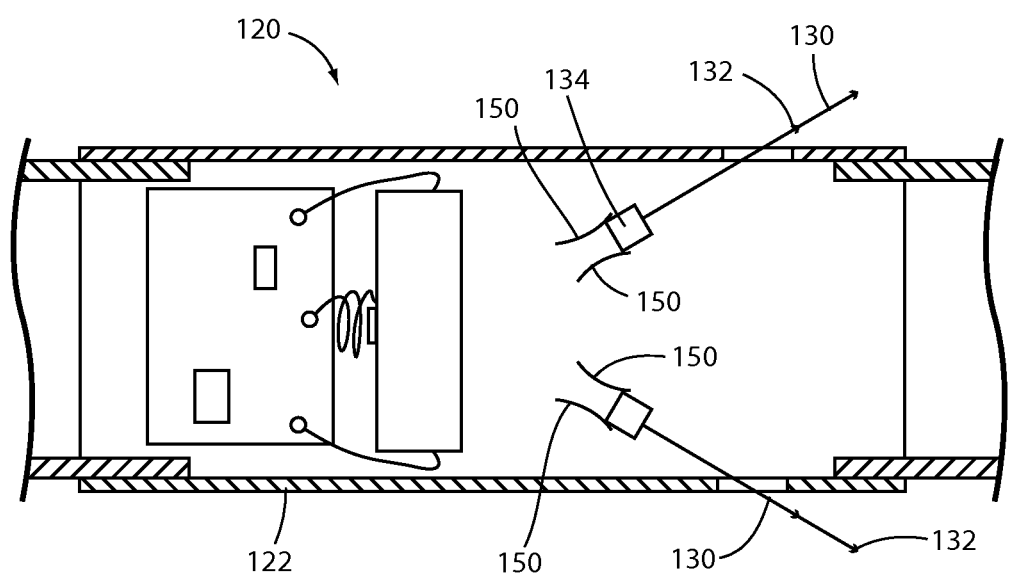
FIG. 5 is a sectional view of the tracking device of FIG. 4, shown with the catching members deployed.

FIGS. 4-13 show additional embodiments of tracking devices in which a mass is used to deploy the catching members on impact. In each of these embodiments, the tracking device is nearly identical to tracking device 20 such that a detailed description need not be repeated. In FIGS. 4 and 5, a tracking device 120 includes catching members 130 having hooking elements or barbs 132 at one end and a mass 134 at the other. Retention elements 150 are used to hold mass 134 in place within a housing 122 until impact, at which point the momentum of mass 134 overcomes the retaining force of elements 150 allowing catching members 130 to deploy as shown in FIG. 5.

Figure 6:
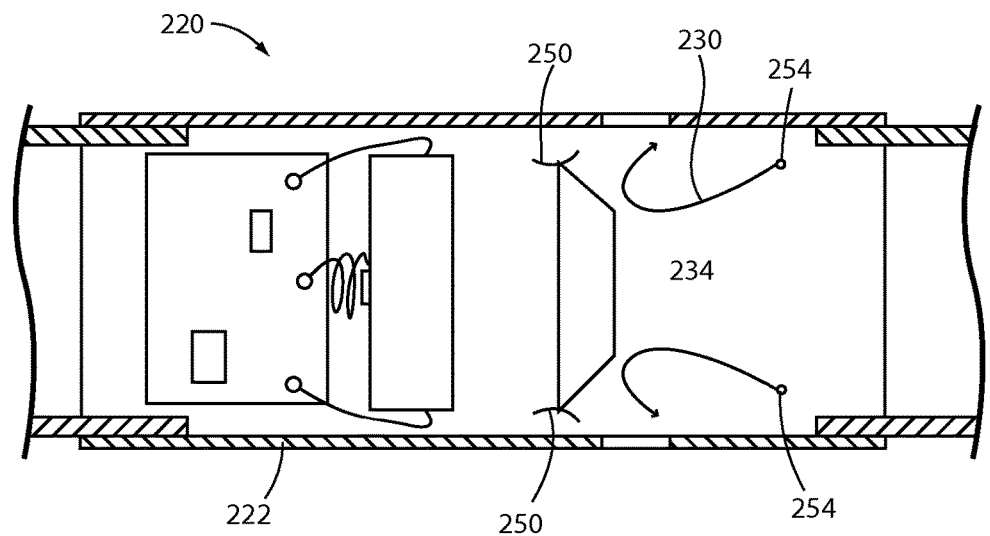
FIG. 6 is a sectional view of an alternative embodiment of a tracking device where the catching members are hooks.
Figure 7:
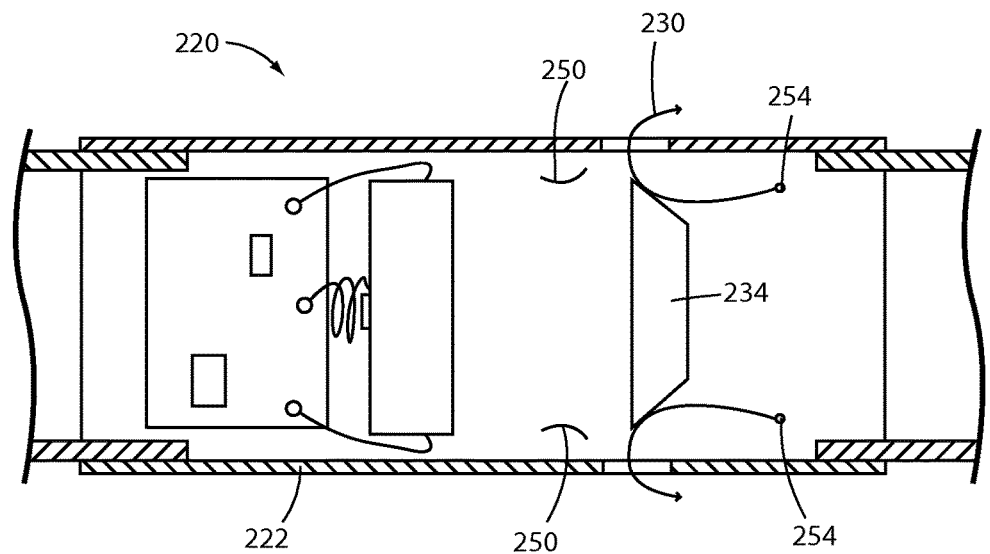
FIG. 7 is a sectional view of the tracking device of FIG. 6, shown with the catching members deployed.

In the embodiment shown in FIGS. 6 and 7, a tracking device 220 includes a housing 222, hook shaped catching members 230 and a moveable mass 234. Catching members 230 attach to housing 222 at pivot elements 254. Retention elements 250 are used to hold mass 234 in place until impact. Upon impact, the momentum of mass 234 is sufficient to overcome the retaining force of elements 250, allowing mass 234 to move between catching members 230. Mass 234 causing catching members 230 to rotate about pivot elements 254 so that catching members 230 protrude from housing 222 as shown in FIG. 7.

Figure 8:
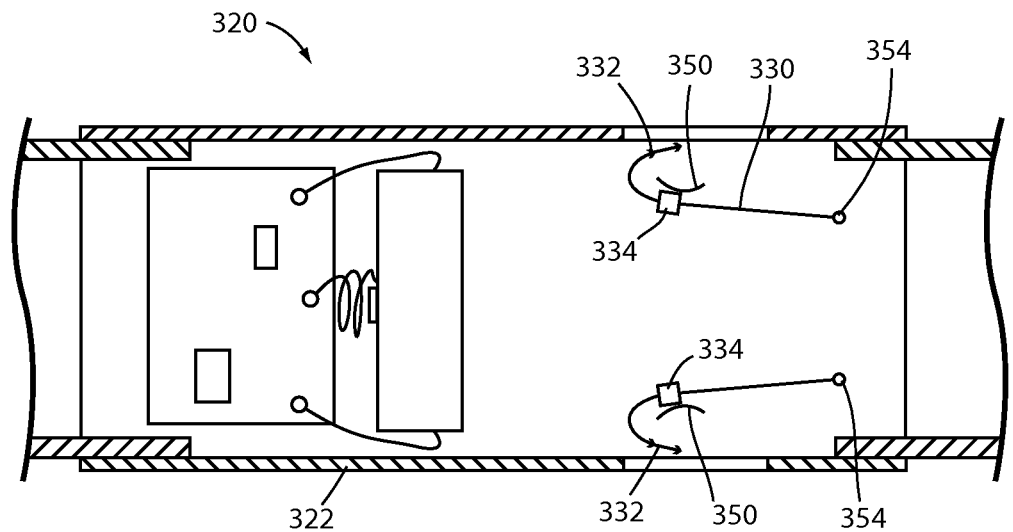
FIG. 8 is a sectional view of an alternative embodiment of a tracking device where the catching members are hook shaped and include an inertial mass.
Figure 9:
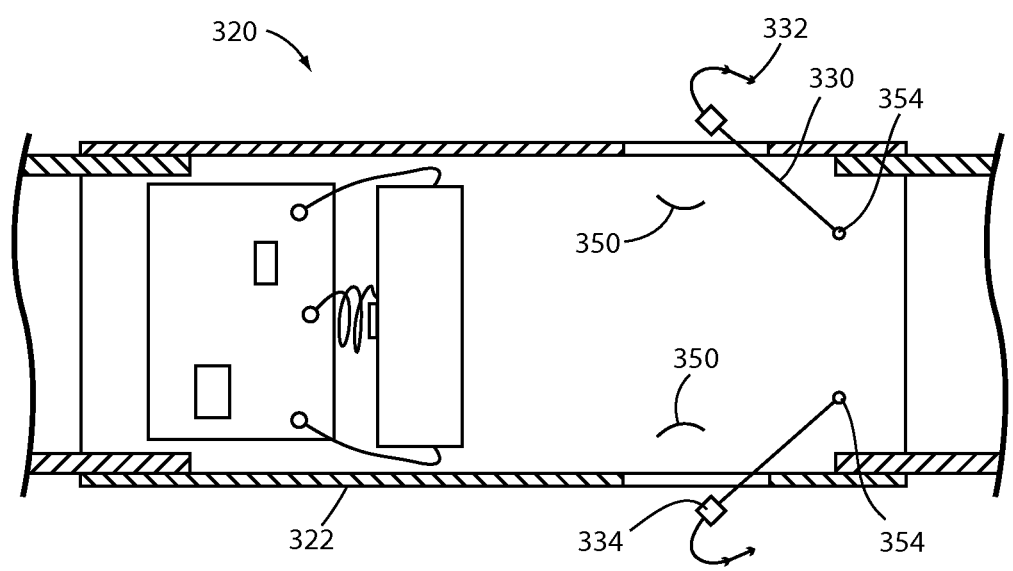
FIG. 9 is a sectional view of the tracking device of FIG. 8, shown with the catching members deployed.

A tracking device 320 shown in FIGS. 8 and 9 has hook shaped catching members 330 similar to catching members 230 discussed above, but with an attached mass 334 near a barbed end 332. Catching members 330 attach to a housing 322 at pivot elements 354. A pair of retention elements 350 keep catching members 330 concealed in housing 322 until impact. At impact, the momentum of mass 334 causes catching members 330 to overcome the retaining force of elements 350 and rotate about pivot elements 354 so that the barbed end 332 of catching members 330 deploys external to housing 322 as shown in FIG. 9.

Figure 10:
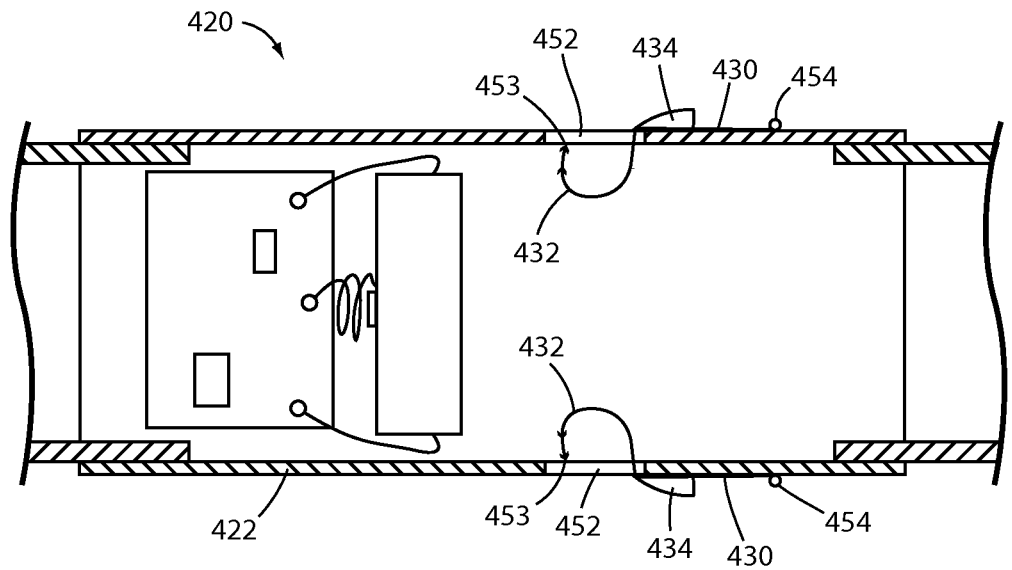
FIG. 10 is a sectional view of an alternative embodiment of a tracking device where the catching members attach external to the transmitter housing.
Figure 11:
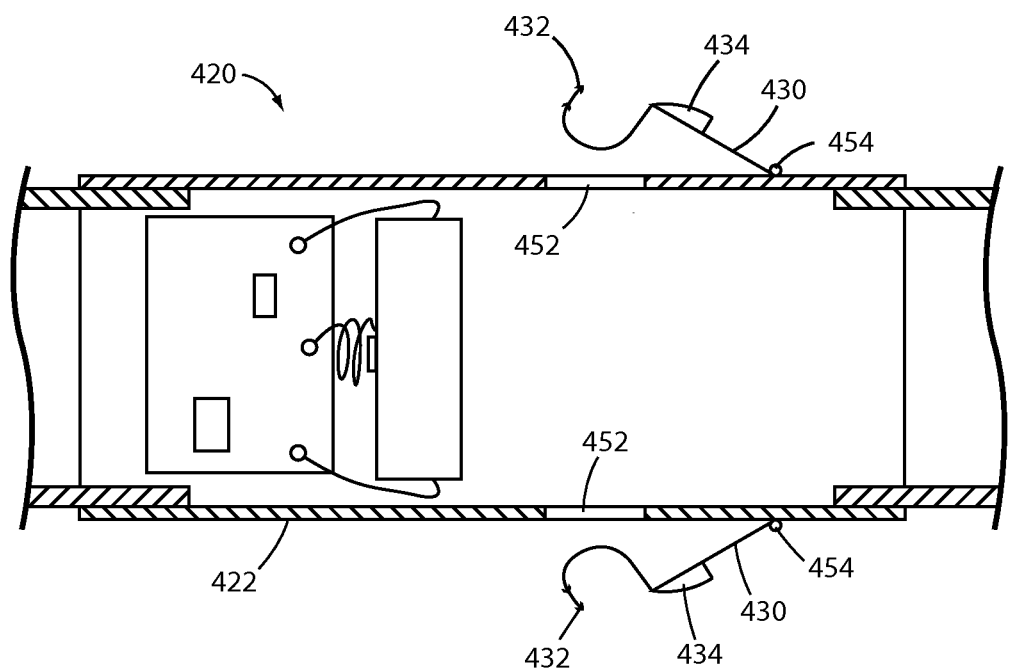
FIG. 11 is a sectional view of the tracking device of FIG. 10, shown with the catching members deployed.

In the embodiment shown in FIGS. 10 and 11, a tracking device 420 includes a housing 422 and flexible catching members 430 having a barbed end 432 and an attached mass 434. Catching members 430 attach to the external surface of housing 422 at pivot elements 454. Slots or openings 452 in housing 422 receive barbed end 432 of catching members 430 so that the barbed end 432 remains generally concealed in housing 422. Contact between barbed end 432 and an edge 453 of slot 452 hold catching members 430 in the retracted position. Upon impact, the momentum of mass 434 causes catching members 430 to flex or bow outward allowing barbed end 432 to release from edge 453 as catching members 430 rotate about pivot elements 454 as shown in FIG. 11. Optionally, catching members 430 may be frangible elements that separate away from the external surface of housing 420 as the momentum of mass 434 causes catching members 430 to rotate about pivot elements 454.

In the illustrated embodiments discussed above, projectile 10 is an arrow and the tracking device is attachment between a shaft 60 and a nock 62 (FIG. 1). It is envisioned, however, that the tracking device could be attached between shaft 60 and an arrow head 64 or embedded in projectile 10, such as internal to shaft 60 or nock 62 so as not to interfere with the aerodynamics and flight of projectile 10.

Figure 12:
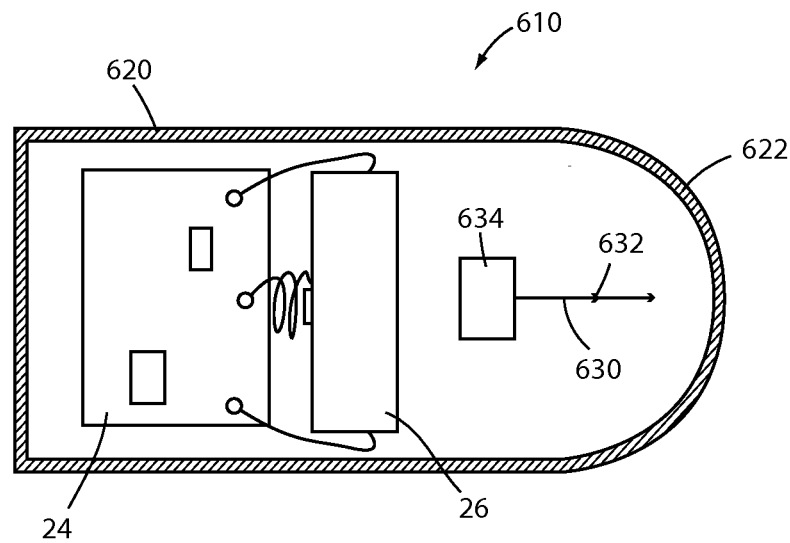
FIG. 12 is a sectional view of an alternative embodiment of a tracking device configured for use with a gun.
Figure 13:
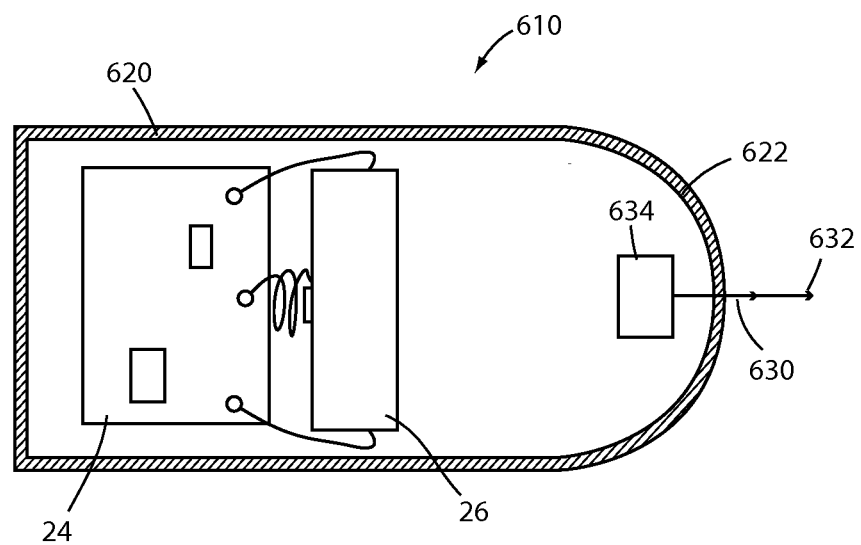
FIG. 13 is a sectional view of the tracking device of FIG. 12, shown with the catching member deployed.

Optionally, the projectile need not be an arrow, but could be any projectile capable of being launched or fired from a gun, rifle, bow, crossbow or the like such as a bolt, dart or similar projectile. For example, FIGS. 12 and 13 show a tracking device 620 incorporated into a projectile 610 configured to be fired from a gun or rifle. In the illustrated embodiment, tracking device 620 includes a transmitter 24, a power source 26, and a catching member 630 enclosed within a housing 622. Power source 26 is moveable relative to transmitter 24 and is configured to make electrical contact with transmitter 24 during launch as discussed above. Catching member 630 includes hooking elements or barbs 632 at one end and a mass 634 at the other. Upon impact with a target, the momentum of mass 634 causes catching member 630 to move forward relative to housing 622, deploying barbs 632 through an opening, slat or pierceable material of housing 622 so that tracking device 620 attaches to the target. Projectile 610 may be launched with low force, such as from an air gun or air rifle, and may be used in law enforcement to track suspects, vehicles, and the like.

Optionally, in each of the disclosed embodiments above, the catching members and the inertial mass may be oriented so the catching members deploy at launch, rather than at impact. Optionally, power source 26 may be used as the inertial mass so that as power source 26 moves to make an electrical connection with transmitter 24, power source 26 also deploys the catching members.

Figure 14:
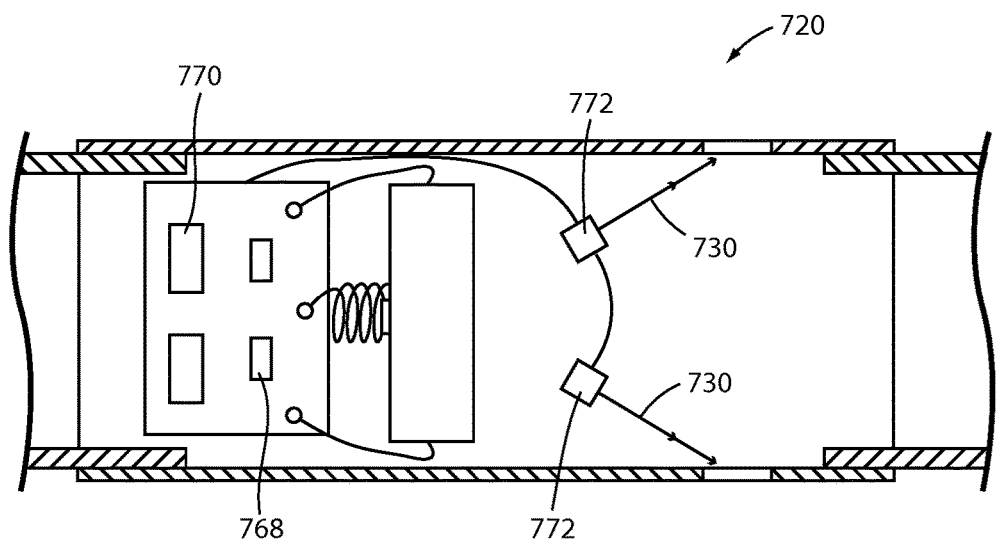
FIG. 14 is a sectional view of an alternative embodiment of a tracking device where an inertia sensing device is used to deploy the catching members.
Figure 15:
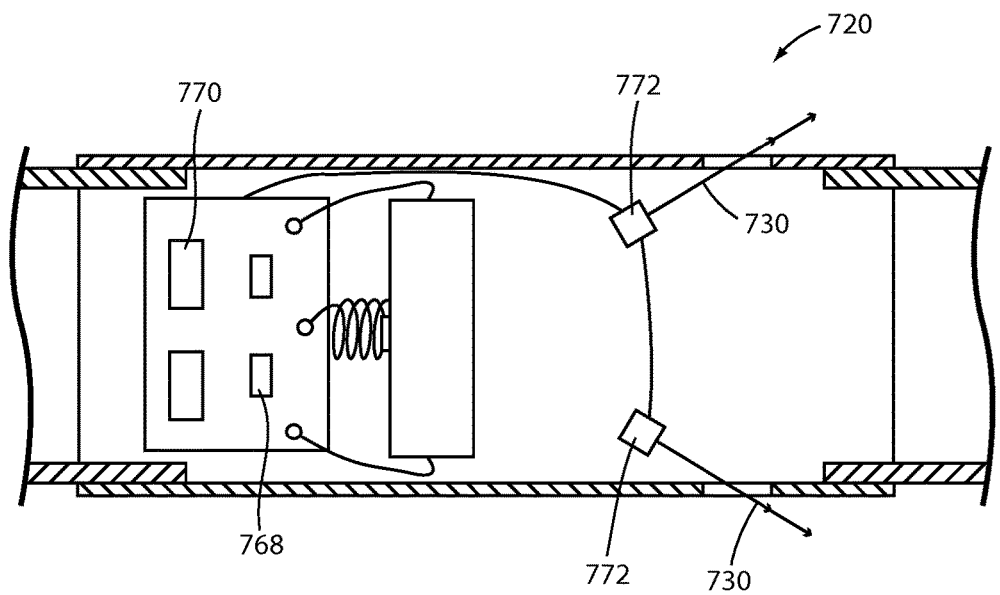
FIG. 15 is a sectional view of the tracking device of FIG. 14, shown with the catching members deployed.

In each of the above embodiments, the mass may be replaced by an inertia sensing device 768, such as an accelerometer, in electrical communication with a controller 770 (FIGS. 14 and 15). Controller 770, in turn, is in electrical communication with a pair of solenoids or other electromechanical devices 772 for deploying catching members 730 from tracking device 720. Sensing device 768 measures the acceleration of tracking device 720 and provides this information to controller 770. When controller 770 has detected that tracking device 720 is undergoing a deceleration indicative of an impact condition, a signal is sent from controller 770 to electromechanical devices 772 to deploy catching members 730 from tracking device 720 as shown in FIG. 15. Alternatively, controller 770 may be configured to deploy catching members 730 when an increase in acceleration indicative of a projectile launch is detected.

Optionally, the tracking device in any of the above disclosed embodiments may include an infrared (IR) light source, such as an IR light emitting diode. The IR light source may be visually detected with the aid of a cell phone camera or any other optical device capable of detecting IR radiation. The tracking device housing may be constructed of a translucent material or may include slots or openings for the IR light to pass.

Optionally, the tracking device in any of the above disclosed embodiments may include a global positioning system (GPS) receiver or an embedded cell phone to aid in tracking. The GPS receiver or embedded cell phone would be able to determine the coordinates of the tacking device. The transmitter may then transmit those coordinates to a receiver to pinpoint the location of the tracking device.

In the illustrated embodiments above, the power source is a battery. Optionally, the power source could include an energy harvesting element such as a piezoelectric element, photovoltaic element, thermoelectric element or the like.

Therefore, the present invention provides a tracking device for tracking a target that has been hit by a projectile. The tracking device includes a transmitter and a catching member having hooks or barbs for attaching the tracking device to the target. The catching members remain generally concealed within the tracking device and may be configured to deploy upon launch or upon impact with the target using an inertial mass or an inertia sensing device. This reduces the impact on the aerodynamics of the projectile and keeps any hooks or barbs safely within the projectile so as not to inadvertently hook on a user or other unwanted object. The concealed catching members also allow a projectile incorporating the tracking device to be launched using the same device as a projectile without the tracking device.

Changes and modifications to the specifically described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A game tracking device comprising:
   a transmitter operable to emit a locating signal capable of detection by a remote receiving device;
   a power source for providing electrical power to the transmitter;
   a housing containing the transmitter and power source therein; and
   a catching member having one or more hooking elements for attaching the housing containing the transmitter and the power source to a target; wherein the catching member is configured to inertially project from a retracted position where the hooking elements are generally concealed within the housing to a deployed position where the hooking elements protrude external to the housing;
   including a mass movable relative to the housing, wherein intertial movement of the mass is configured to project the catching member from the retracted position to the deployment position;
   wherein the mass is attached to the catching member;
   wherein the power source is the mass.

2. The tracking device of claim 1, including an inertia sensing device for sensing the acceleration experienced by the transmitter, wherein an output of the inertia sensing device is configured to project the catching member from the retracted position to the deployed position.

3. The tracking device of claim 1, wherein the transmitter is a radio frequency transmitter.

4. The tracking device of claim 3, wherein the radio frequency transmitter includes a microelectromechanical system oscillator.

5. The tracking device of claim 3, wherein the radio frequency transmitter includes a surface acoustic wave oscillator.

6. The tracking device of claim 1, wherein the transmitter includes an infrared light source.

7. The tracking device of claim 1, wherein the transmitter includes a global positioning system receiver.

8. The tracking device of claim 1, wherein the transmitter includes an embedded cell phone.

9. The tracking device of claim 1, wherein the power source is a battery.

10. The tracking device of claim 1, wherein the power source is an energy harvesting power supply.

11. A game tracking device comprising:
   a transmitter operable to emit a locating signal capable of detection by a remote receiving device;
   a power source for providing electrical power to the transmitter;

a housing containing the transmitter and power source therein; and a catching member having one or more hooking elements for attaching the housing containing the transmitter and the power source to a target; wherein the catching member is configured to inertially project from a retracted position where the hooking elements are generally concealed within the housing to a deployed position where the hooking elements protrude external to the housing;

including a mass movable relative to the housing, wherein intertial movement of the mass is configured to project the catching member from the retracted position to the deployment position;

wherein the power source is the mass.

* * * * *